(12) United States Patent
Zimmer et al.

(10) Patent No.: US 8,136,640 B2
(45) Date of Patent: Mar. 20, 2012

(54) BRAKE- AND/OR CLAMPING DEVICE FOR SHAFTS WITH A CLAMPING RING

(76) Inventors: Günther Zimmer, Rheinau (DE); Martin Zimmer, Rheinau (DE)

( * ) Notice: Subject to any disclaimer, the term of this patent is extended or adjusted under 35 U.S.C. 154(b) by 700 days.

(21) Appl. No.: 12/290,010

(22) Filed: Oct. 24, 2008

(65) Prior Publication Data

US 2009/0101452 A1 Apr. 23, 2009

Related U.S. Application Data

(63) Continuation-in-part of application No. PCT/EP2007/000716, filed on Apr. 23, 2007.

(30) Foreign Application Priority Data

Apr. 24, 2006 (DE) .................... 10 2006 019 350

(51) Int. Cl.
*F16D 55/14* (2006.01)
*F16D 53/00* (2006.01)
(52) U.S. Cl. .......... 188/72.7; 188/71.1; 188/71.5; 188/71.8; 188/161; 188/170; 188/259; 192/70.14; 192/70.15; 192/85.21; 192/107 M; 192/107 R
(58) Field of Classification Search .......... 188/71.1, 188/71.4, 152, 366, 72.3, 72.4, 73.2, 170, 188/70 R, 171, 259; 192/66.21, 70.28, 85.21, 85.22, 70.15; F16D 51/00, 53/00, 55/00, 59/00, 13/64, 65/12; H02K 7/112
See application file for complete search history.

(56) References Cited

U.S. PATENT DOCUMENTS

| 1,395,841 | A | * | 11/1921 | Lavoie | 192/18 R |
| 2,344,046 | A | * | 3/1944 | Le Tourneau | 192/66.23 |
| 2,771,977 | A | * | 11/1956 | Uher | 192/93 R |
| 3,548,986 | A | * | 12/1970 | Fisher | 192/85.21 |

* cited by examiner

*Primary Examiner* — Robert Siconolfi
*Assistant Examiner* — San Aung
(74) *Attorney, Agent, or Firm* — Klaus J. Bach

(57) ABSTRACT

In a brake- and/or clamping arrangement for a shaft supported in a device housing and comprising a braking disc mounted on the shaft rigidly for rotation therewith and a clamping ring supported in the device housing, the braking disc has a friction area comprising two truncated cone-shaped friction surfaces with at least one brake cone arranged in the device housing and one arranged on an activating member. One brake cone abuts during braking or clamping the brake disc whereas the other brake cone abuts a clamping ring, which is disposed between contact areas of the brake cones, the clamping ring in contact with the brake disc and a brake cone being mounted to the apparatus housing.

7 Claims, 6 Drawing Sheets

Fig. 3
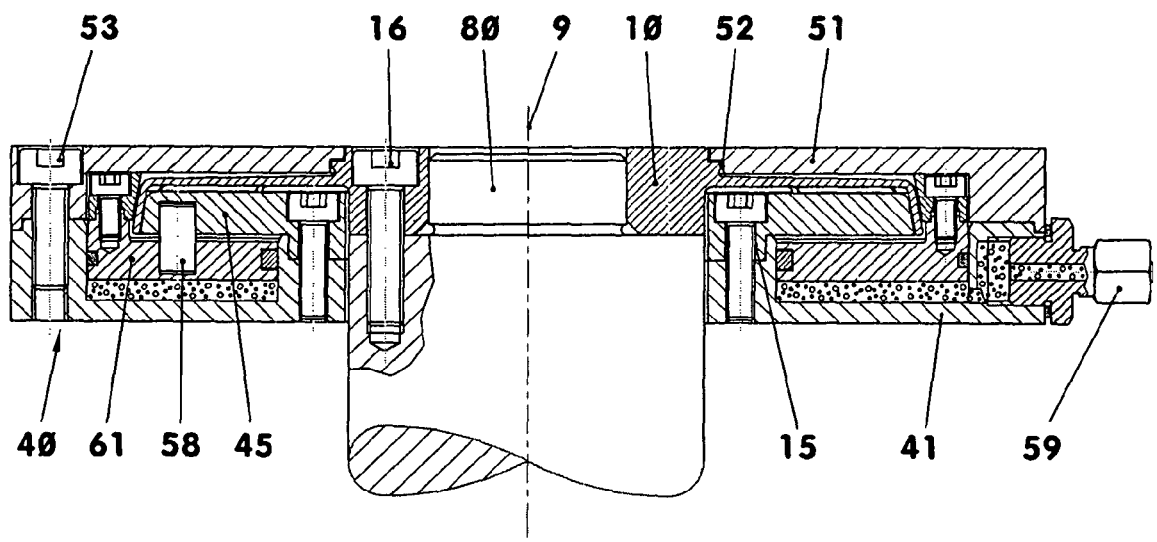
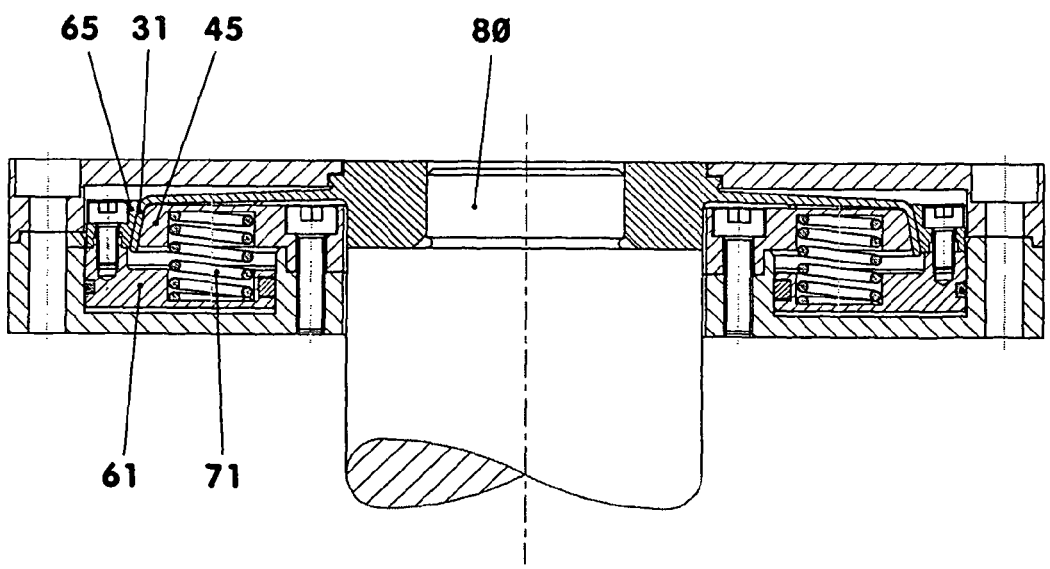
Fig. 4

31 11 21 23 38 24 37 22

10  12  15

25  17

26
3
10

BRAKE- AND/OR CLAMPING DEVICE FOR SHAFTS WITH A CLAMPING RING

This is a continuation-in-part application of pending international patent application PCT/EP2007/000716 filed Apr. 23, 2007 and claiming the priority of German application 10 2006 019 350.4 filed Apr. 24, 2006.

BACKGROUND OF THE INVENTION

The invention resides in a brake- and/or clamping device of a shaft supported in an apparatus housing, or a device housing, with a brake disc firmly supported at or on the shaft for rotation therewith, wherein the brake disc comprises a friction area including at least a truncated cone-shaped friction surface and at least one brake cone which is arranged in the device housing and which abuts the friction surface during braking or clamping.

Such a device is disclosed as a cone brake in DE 602 397 C. But this device includes a brake disc which has an inherently rigid intermediate area. U.S. Pat. No. 2,771,977 discloses a cone clutch with only one friction surface pairing.

It is the object of the present invention to provide a brake- and/or clamping device for rotating shafts which has large clamping forces and short reaction times, is of a simple space-saving design and is furthermore durable and requires no servicing. Also, the rotating parts of the device should affect the acceleration behavior of the shaft to be braked or clamped as little as possible during normal operation when it is not braked.

SUMMARY OF THE INVENTION

To this end, the brake cone is axially movable either by two control members—one in each case for a braking or clamping loading and a venting unloading of the brake disc—either by two actuating members, one for the actuation in the loading and one for the actuation in the unloading direction—or by an actuating member for an actuating mechanism and a spring system with at least one spring element for the other direction of operation. In the device housing, a clamping ring is non-rotatably supported. The clamping ring includes a flange connecting area, an intermediate area and a clamping area. The clamping area is axially slidable with respect to the flange connecting area by way of the intermediate area which is disposed between those areas, the intermediate area being elastic, at least over sections thereof. The clamping area has an outer and an inner clamping surface in the form of a truncated cone. The outer clamping surface is arranged opposite the friction surface of the brake disc whereas the inner clamping surface is disposed in front of the friction surface of the brake cone.

In this brake- and/or clamping device for example a shaft supported in a machine housing is braked or firmly clamped. The housing of the device is herein directly and rigidly connected to the machine housing so that the brake force path between the device housing and the machine or, respectively apparatus housing is as short as possible. The apparatus housing may also be merely a frame structure. The device housing may also be part of the machine housing.

The device is used for example in the manufacture of machine tools among others in turntables and transmission spindles for direct braking and/or clamping. In the manufacture of handling apparatus, it is integrated also as locking structure into robot joints. Furthermore, it can also be utilized indirectly as carriage brake or clamping structure if the carriage includes a threaded spindle drive or similar.

The brake- and/or clamping device is generally operated by way of a spring system and is released by way of a pneumatic drive forming an actuating member. It can in this way be used and installed as an emergency braking system. The braking disc is directly installed between the shaft which is to be braked or clamped and the device housing. Since the braking disc is fixedly disposed on the shaft for rotation therewith—without play—the shaft can be held in position precisely and without back and forth play by the friction retaining means installed in the device. The clamping ring which during braking or clamping comes into contact with the braking disc in a force and friction locking way transmits the force flow generated by the retaining of the shaft into the device housing via the shortest distance. This provides for a particularly rigid play-free locking and a large locking force.

As control members, among others, hydraulic cylinder piston units, piezo actuators or shape memory elements may be used. All control members may be used in the engagement—as well as in the release direction. As control members, among others, hydraulic cylinder piston units, piezo control elements or shape memory elements may be used. All control members may be used for the load application as well as in the opposite direction for load removal. Herein control elements of the same type or different-type control members may be arranged in, or on, a housing for actuation in either load direction—in a series or in a parallel arrangement. Furthermore, pneumatic control members may be operated by an inert gas.

The invention will become more readily apparent from the following description of advantageous embodiments with reference to the accompanying drawings.

BRIEF DESCRIPTION OF THE DRAWINGS

It is shown in:

FIG. 3: another longitudinal sectional view of FIG. 1 about in original size, FIG. 4: a longitudinal sectional view of FIG. 1 in a clamping state.

FIG. 9: section of the friction area of FIG. 2;

FIG. 13: clamping disc with slotted friction and intermediate area; and in

DESCRIPTION OF PARTICULAR EMBODIMENTS

Figure 2:
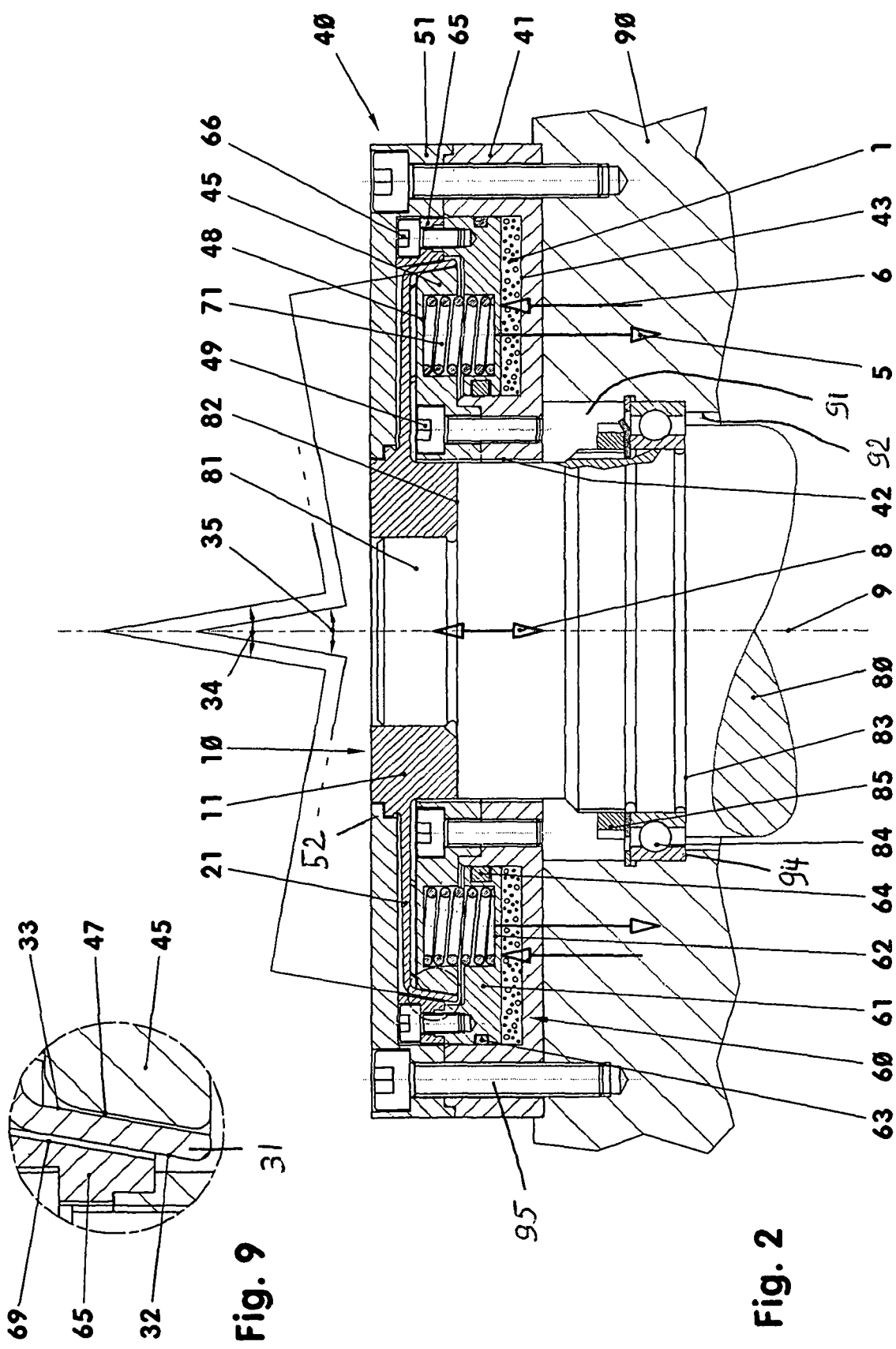
FIG. 2: a longitudinal sectional view of FIG. 1, enlarged.

FIG. 2 shows a shaft (80) rotatably supported in an apparatus housing (90) by an antifriction bearing. At the front end of the shaft end, a brake disc (10) is mounted. The brake disc (10) which includes a friction area (31) is surrounded by a device housing (40) connected to the apparatus housing (90). In the device housing (40), there is, among others, an axially movable brake cone (65) which, via spring elements (71), biases the friction ring (31) of the brake disc (10)—for dry braking or clamping for example—against a stationary non-rotatable brake cone (45), see FIG. 4. For releasing the brake disc (10), the clamping effect can be eliminated for example using a pneumatic control member (60).

In the embodiment according to FIG. 2, the shaft (80) is supported in the apparatus housing (90) with almost no play. The bearing structure shown comprises a rigid support structure in which the antifriction bearing (84) is fixed by way of a shaft nut (85) secured by a locking ring against a shoulder (83) of the shaft (80). The outer ring of the antifriction bearing (84) is disposed in the apparatus housing (90) in a stepped bore (91) between a housing shoulder (92) and the shaft unit (85). Consequently, the shaft (80) has only little axial play in the apparatus housing (90).

The apparatus housing (90) has a flange surface (94) which extends normal to the centerline (9) of the shaft and on which the device housing (40) is centrally positioned and mounted by bolts (95).

The device housing (40) consists of a base body (41) and a housing cover (51). Both parts are provided with a central through bore (42, 52) for accommodating the shaft (80). The base body (41) includes an annular space (43) which is concentric with the through bore. This annular space (43) represents the cylinder of the pneumatic control member (60). In the annular space (43), an annular piston (61) is disposed. The annular piston (61) is sealed with respect to the walls of the annular space (43) by at least two seal rings (63, 64). The inner seal ring (64), which has a smaller diameter, has a cross-section which is two or three times that of the outer, larger seal ring (63). The radially outer surface of the annular piston (61) is spherical or curved in order to avoid cogging. The radius of curvature corresponds to about 80% of the outer diameter of the annular piston. The center of curvature is for example in the area of half the height of the annular piston (61) or at the level of the center plane of the seal ring (64).

Figure 5:
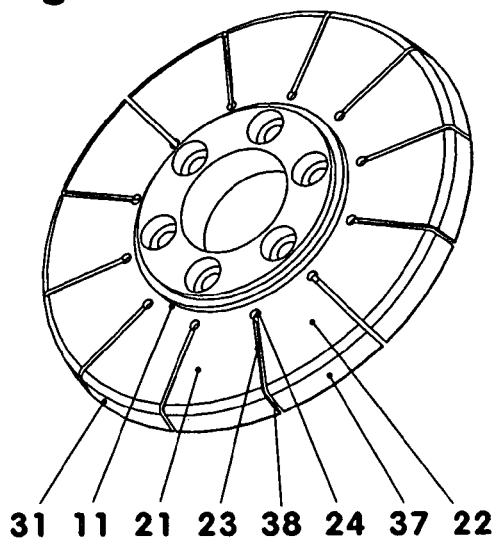
FIG. 5: a brake disc with friction and intermediate areas including several slots.

At the side of the annular piston (61) opposite the pressurized air side, an annular brake cone (65) is formed or centrally connected thereto, see FIG. 5. This brake cone (65) has a truncated cone-shaped friction surface (69). The theoretical tip of the truncated cone is disposed, in the direction of the brake-releasing actuation device (6), on the centerline (9) outside the device housing (40).

The brake cone (65) may, if appropriate, consist of individual segments. Between the individual segments spaces may be provided which are longer than the segments themselves.

Furthermore, at the side opposite the pressurized air, the annular piston (61) may have several blind end bores (62) for accommodating compression coil springs (71). Instead of the compression coil springs, plate spring packets or conical coil springs may be used. The blind end bores (62)—it may be 3-12 bores—are arranged equidistantly distributed, along a circle around the center line (9).

On the housing area, which is disposed between the annular space (43) and the shaft (80), a further brake cone (45) is mounted by bolts (49). This outer cone (45) has the form of a disc with a center opening. Its radially outer wall, that is the friction surface (47), has the form of a truncated cone. Also, the theoretical tip of this truncated cone is disposed, in the brake release direction of the actuating mechanism (6), outside the device housing (40) on the center line (9) of the shaft (80). The cone angles (34, 35) of the friction surfaces (47, 69) are identical in the exemplary embodiments.

The friction surfaces (47, 46) of the non-rotatable brake cones (45, 46) may be provided with special brake pads or with comparable coatings. Also, only one friction surface may be provided with a pad.

The brake cone (45) has several dead end bores (48) facing the annular piston (61). Those dead end bores (45) are arranged opposite the dead end bores (62) of the annular piston (61).

In FIG. 3, further dead end bores in the annular piston (61) and in the brake cone (45) are visible in the left half of the figure. They support a bolt (58) which serves to prevent relative rotation between the annular piston (61) and the device housing (40). To this end, the bolt (58) is firmly pressed into the stationary brake cone (45) whereas it extends into the bore of the annular piston (61) with play.

On the base body (41), for example, the disc-shaped housing cover (51) is disposed centered thereon. The latter is fixed to the base body (41) by means of cover bolts (53), see FIG. 3. The multiply-stepped through-bore (52) functions with regard to the rotating parts (10, 80) of the device as a frictionless labyrinth seal.

As shown in FIG. 2, the shaft (80) has at its end a shoulder (82) on which the brake disc (10) is supported and mounted. The brake disc (10), to this end, has an annular flange area (11), see FIGS. 5 and 6, with several mounting bores (15). By way of the center bore (12) of this area, the brake disc (10) is disposed centered on the shaft lug (81). It is axially fixed by way of the bolts (16) disposed in the bores (15), see FIG. 3. The center lines of the bores (15) extend parallel to the center line (9).

Adjacent the flange area (11), an intermediate area (21) is disposed which is for example, disc-shaped and provided with a friction area (31). In the transition area between these areas (11, 21), the flange area (11) has a stepped outer contour, see FIG. 5. The latter corresponds essentially to the inner contour of the multiply stepped bore (52) of the housing cover (51). The radially measured gap width of this seal gap is for example about 0.2 millimeter. Ideally, this is also true for the axial gap width.

Figure 6:
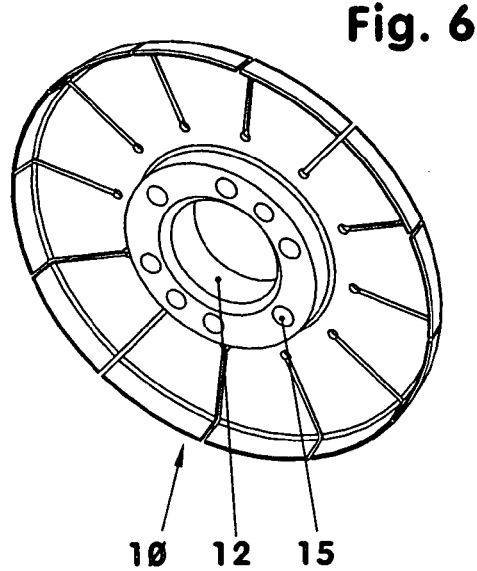
FIG. 6: same as FIG. 5 but shown in a rear view.

The friction area (31) has in accordance with FIGS. 5 and 6, the envelop contour of a ring whose radial outer and inner walls have a truncated conical shape. These walls are the friction surfaces (32, 33). Their cone angles (34, 35) have only by way of example the same size. In the exemplary embodiments the cone angles (34, 35) are 20 degrees. The wall thickness of the friction area (31) is, newly installed, for example 1 mm. The friction area (31) may have a coating with a high friction coefficient. For the two friction pairings friction area (31)/outer friction cone (65) and friction area (31)/inner friction cone (45), comparable or different materials—and friction coefficient combinations may be used.

Alternatively, in connection with the apparatus which are only used for locking a still standing shaft, the friction surfaces of a friction surface pairing in contact with one another may be provided with a teeth and grooves for example comparable with Hirth-type serrations. With a small serration distribution in this connection, adjacent clamping positions are possible which permit a reposition changes of the shaft by an angle of less than one degree.

For the intermediate area (21) disposed between the friction area (31) and the flange mounting area (11) numerous design variants exist of which only a few are presented here. The intermediate area (21) is to compensate for any axial displacement of the friction area (31) relative to the shaft position or respectively relative to the flange area (11), see FIG. 4. In this figure, the arrangement with a clamped shaft (80) is shown. The outer brake cone (65) pulls, via the spring-biased annular piston (61), the friction area (31) toward the inner brake cone (45). The cones (45, 65) in the form of a wedge drive engage the friction area (31) therebetween. The axial displacement is in the shown variants about 0.75 millimeter. With an advanced wear of the friction surfaces, it may increase to one millimeter. Depending on the choice of material and the intermediate area shape, in brake discs of this size, axial elastic displacements of up to 3 millimeters are possible.

The mean effective diameter of the friction area 31 changes with an axial friction area displacement only slightly. This influence can be minimized by the use of tangentially arranged spokes (26), see FIG. 6. The minimal axial length reduction of the distance between the areas (11, 31) is compensated for, at least at standstill, by an "unwinding" of the tangential spokes (26). A brake disc (10) with tangential spokes (26) clamps the shaft in the direction of rotation (3) with a higher rigidity than with rotation in the opposite direction of rotation.

The brake disc (10) shown in FIG. 5 has radial spokes (25). The rigidity of those spokes is independent of the direction of rotation. The spokes (25) are widened toward the hub for example by the factor 3. The symmetric widening of the spokes provides for a very high rotational rigidity.

The FIGS. 5 and 6 show a brake disc (10) as it is installed in the apparatus according to FIGS. 2-4. The intermediate area (21) and the friction area (31) are divided by radial slots (23, 38) into for example circular ring section-shaped segments (22, 37). The slots (23, 38) end in the transition area to the connecting flange (11) with small bores (24) for reducing stress concentration. The slotted brake plate is used for a shaft speed range below 1000 rpm.

Figure 1:
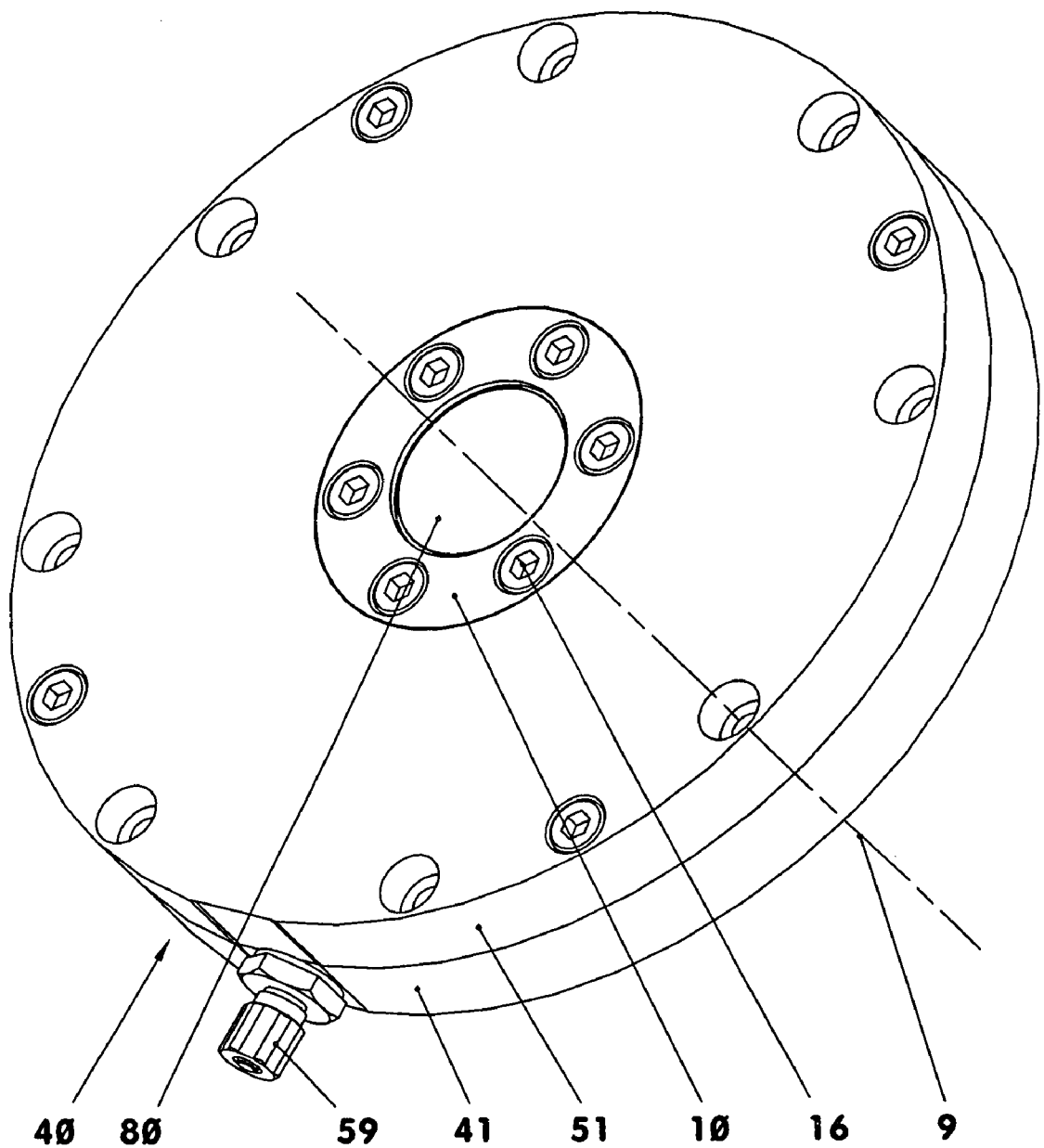
FIG. 1: a diametric representation of a brake and/or clamping device about in original size.

An unworn brake disc (10)) has, when not changed together in the device housing (40) in accordance with FIG. 1 on air gap of for example 0.3 mm width the air gap between the friction area (31) and the inner brake cone (45) is about 1.5 mm.

In the apparatus cross-section according to FIG. 3, the pneumatic connection (59) for the cylinder-piston unit is additionally shown. In accordance therewith, the annular piston (61) is part of a one-way operable cylinder. With compressed air admission, the brake or respectively, the clamping structure is maintained in a release position against the action of the spring elements. Upon switching off or an interruption of the compressed air admission, the spring elements (71) press the annular piston (61) downwardly, see FIG. 4. As a result, the annular piston (61) pulls the brake cone (65) toward the friction section (31). The latter is biased thereby against the brake cone (45) for clamping action.

In its lower position, the annular piston (61) is disposed for example by way of three cams (not shown) arranged at its air pressure exposed front side on the bottom of the annular space (43).

With fast-rotating shafts (80) annoying flux noises may develop within the device housing (40). In order to dampen these annoying noises and/or to insulate them, for example, an absorber insert—not shown here—is cemented into the housing cover (51). It is manufactured for example from an open-cell porous material.

Figure 10:
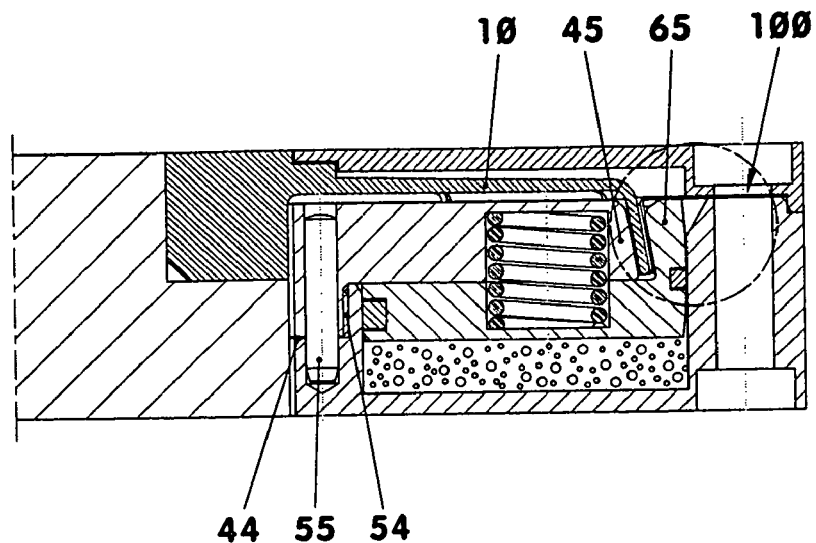
FIG. 10: clamping device with clamping disc in a partial longitudinal sectional view, not activated.
Figure 11:
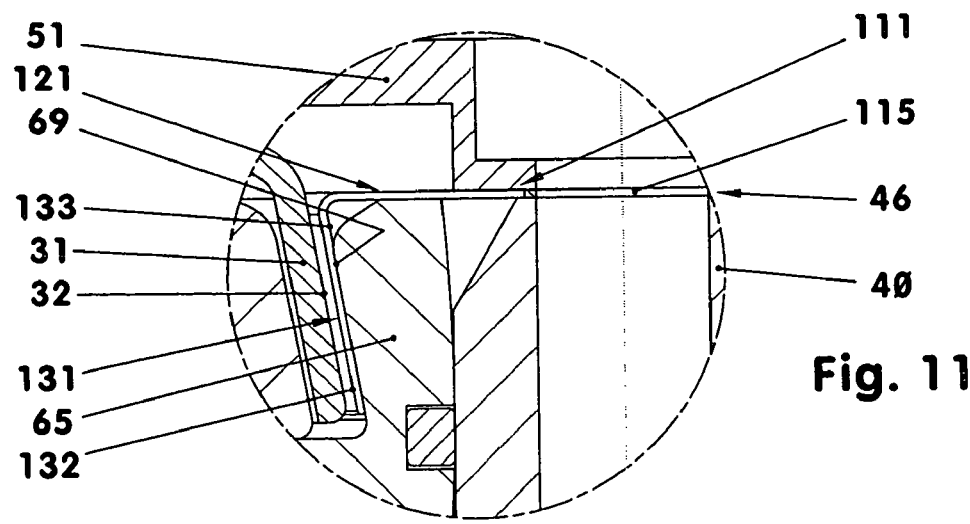
FIG. 11: section of the clamping area of FIG. 10.
Figure 12:
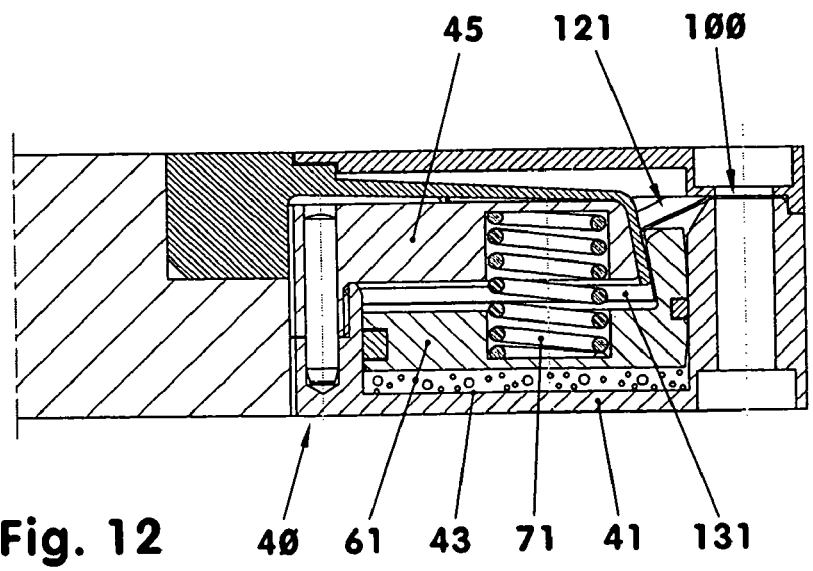
FIG. 12: like FIG. 10, but in a clamping state.

In the FIGS. 10-12, a brake and/or clamping arrangement is shown, which has an enlarged annular piston face area for the same construction space. This is achieved by a changed connection between the base body (41) and the brake cone (45). The two parts (41) and (45) are no longer interconnected by bolts (49), FIG. 2, but they are directly screwed together via a thread (54) arranged in the respective mounting joint (44). The balls (49) as used in FIG. 2 are replaced by several—that is at least two—cylindrical pins (55). The bores for the cylindrical pins (55) are manufactured only after the two components (41, 45) have been threaded together. The cylindrical pins (55) serve among others as safely components preventing the unscrewing of the two components.

Furthermore, the annular piston (61) and the brake cone (65) supported thereby are manufactured from a single piece. By elimination of the bolts (66) used so far, see FIG. 2, the effective diameter of the braking disc (10) can be increased.

Furthermore, the brake cone (65), (see also FIG. 11), is no longer in direct contact with the outer friction surface (32) of the friction area (31) of the braking disc (10). Between the clamping area (31) and the brake cone (65), the clamping area (131) of a clamping ring (100) is located.

Figure 14:
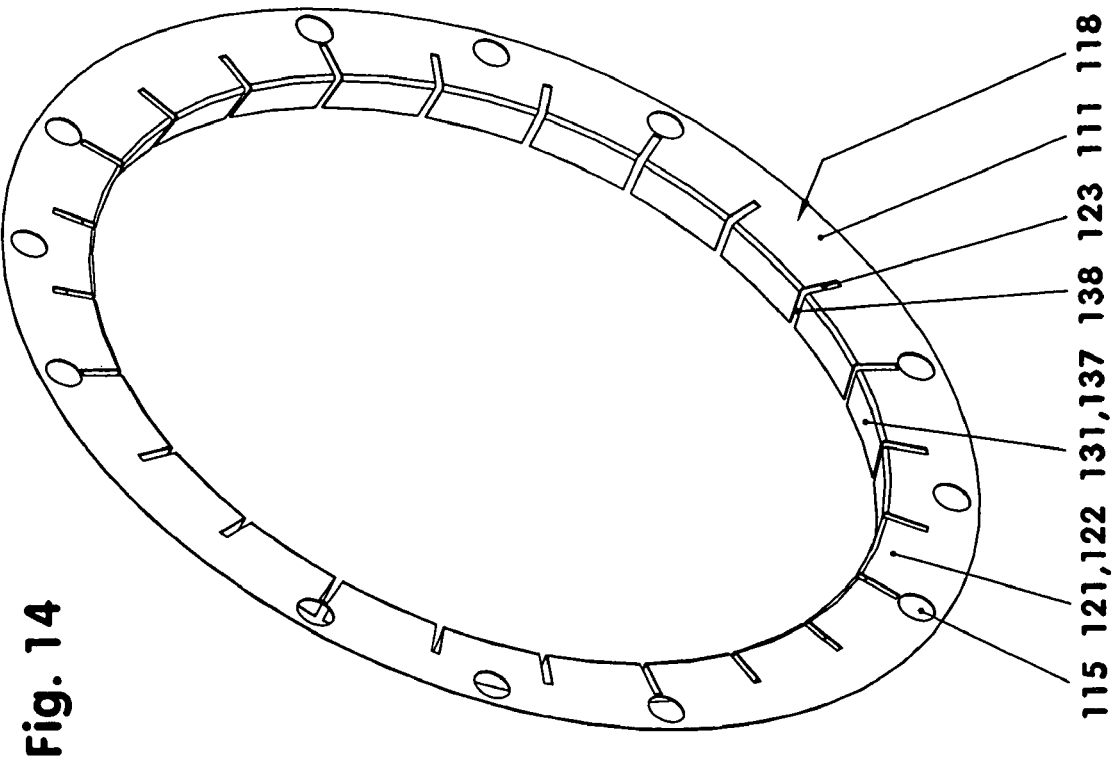
FIG. 14: same as FIG. 13, but shown from the rear.
Figure 13:
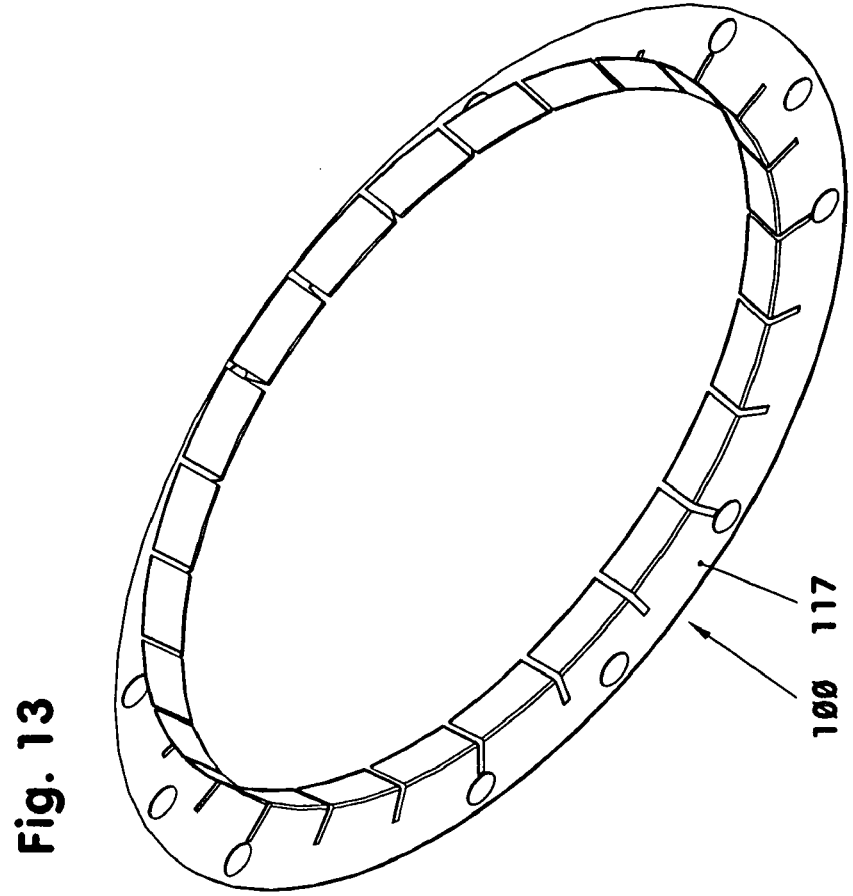

The clamping ring (100), see FIGS. 13 and 14, is a thin-walled ring with an angled cross-section. The annular zones arranged in a plane as shown in FIGS. 13 and 14 represent the flange connecting area (111) and the inwardly extending intermediate area. In the flange-connecting area (111), there are bores (115). Next to the intermediate area (121), there is, at an angle thereto, the clamping range (131).

The intermediate range and the clamping range (121, 131) comprise a plurality of spokes (122, 137). There are, for example, 24 spokes. The spokes (122, 137) are separated by radial slots (123, 138). The slots (123) may be provided in the flange connecting area (111) at their ends with tension reducing bores as they are shown for the brake disc (10) in FIG. 5.

Figure 7:
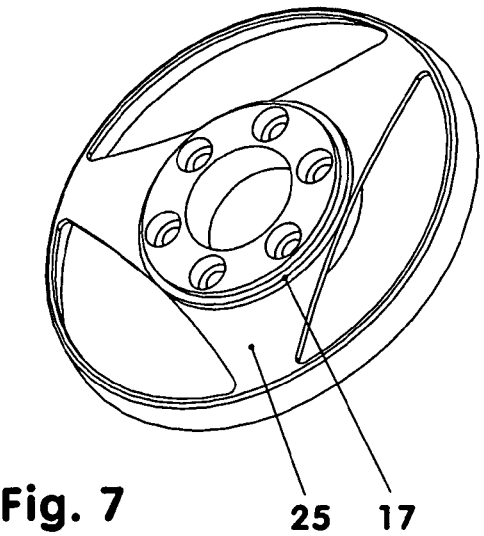
FIG. 7: brake disc with radial spokes.
Figure 8:
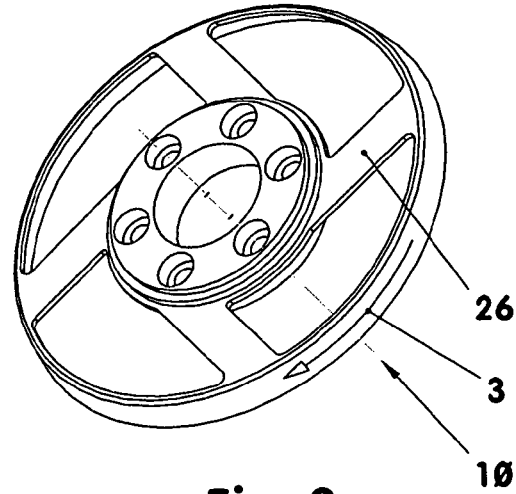
FIG. 8: brake disc with tangential spokes.

The radial spokes (122) may also have a trapezoidal shape as they are shown for the brake disc (10) in FIG. 7. Also, tangential spokes (26) as they are shown for the clamping ring in FIG. 8 are possible. Instead of spokes (122), the intermediate space may also be in the form of a metal membrane. The metal membrane has in cross-section a wave contour. The latter facilitates axial displacement with very high torsional rigidity.

As shown in FIGS. 13 and 14, the clamping area (131) has the over all contour of a ring with truncated cone shaped outer and inner walls. These walls are the clamping surfaces (132, 133). Their cone angles are the same only as an example, see FIG. 2. In the shown examples, the cone angles (34, 35) are 20 angular degrees. The clamping area (131) may have a coating with a high friction coefficient. In the friction pairing friction area (31)/clamping ring (100), comparable or different material and friction coefficient combinations may be used.

In the clamping area (131) instead of the segments (137) a continuous ring may be used, see in this connection the closed ring of the brake disc (10), FIG. 8.

As long as within the brake- and/or clamping device in connection with the brake ring and the clamping ring, a component with a closed ring is arranged opposite a component with ring segments (37) or (137), the arrangement can also be used for braking. However, if the two opposite components include both sections (37, 137) which are engaged upon actuation of the arrangement, the clamping can be executed only when the shaft is at a standstill. In this case, only a locking function is available.

If only the locking function is required, the segments or the closed rings may be provided additionally with serrations which firmly engage each other in a form-locking manner upon actuation of the apparatus.

The wall thickness of the clamping ring (100) which is for example constant over all areas (11, 121, 131) is, upon installation, for example 0.2 to 0.3 millimeter. As material for example, the steel 46 Si 7 is used.

In the area of the friction surfaces (69) of the brake cone (65), the clamping ring (100) is connected to the brake cone (65), for example, by spot welding.

For operating the brake and/or clamping device according to FIGS. 10 to 12, the annular piston (61) is moved downwardly by the spring elements (71) upon venting of the annular space (43). In this process, the annular piston (61) pulls along the clamping area (131) of the clamping ring (100) via the friction surface (69). In accordance with FIG. 12, the clamping surface (132) of the clamping area (131) abuts the friction surface (32) of the friction area (31). The intermediate area (121) of the clamping ring (100) is pulled downwardly in this process while being elastically deformed. In the clamped state, the friction surface (32) sticks to the clamping surface (132) under the effect of the clamping force. The torsion moment effective on the shaft is therefore directed over the shortest path via the intermediate area (121) of the clamping ring (100) and the mounting gap (46) into the device housing (40). No torsion moment is therefore effective in this case between the brake cone (45) and the base body (41).

After a release of the brake and/or clamping device for example by a pneumatic actuation of the annular piston (61), the brake disc (10) and the clamping ring (100) are again released. They disengage from one another and from the brake cones (45) and (65). The clamping ring (100) in this case however is still disposed—at least partially—in contact with the brake cone (65). The brake disc (10) and the clamping ring (100) return each elastically—without plastic deformations—to their initial positions as shown in figure (10).

All the brake discs and/or clamping rings shown have elastically deformable intermediate areas formed integrally from a single piece. Alternatively, the intermediate areas may be integrated into the brake disc and/or the clamping ring in a force-, form- or material interlocking manner, for example of the material of the friction or, respectively, the clamping area or the flange connecting area. If appropriate, the intermediate area may additionally include spring elements which, among others, enhance the elastic return of the friction area after a clamping procedure.

Listing of Reference Numerals

| | |
|---|---|
| 1 | Air, gas |
| 3 | Direction of rotation of the shaft |
| 5 | Actuating direction, braking, loading |
| 6 | Actuating direction, brake releasing, unloading |
| 8 | Axial direction |
| 9 | Centerline of the device and the shaft (80) |
| 10 | Brake disc |
| 11 | Flange connecting area |
| 12 | Bore, central |
| 15 | Mounting bores |
| 16 | Bolts |
| 17 | Outer contour, stepped |
| 21 | Intermediate area, elastic |
| 22 | Segments, circular ring section contour, spokes |
| 23 | Slots |
| 24 | Bores at end of slots |
| 25 | Spokes, radial |
| 26 | Spokes, tangential |
| 31 | Friction area |
| 32 | Friction surface, outer, truncated cone contour |
| 33 | Friction surface inside, truncated cone contour |
| 34 | Cone angle outside |
| 35 | Cone angle inside |
| 37 | Segments |
| 38 | Slots |
| 40 | Arrangement housing |
| 41 | Base body |
| 42 | Through bore |
| 43 | Annular space, cylinder |
| 44 | Mounting gap between (41) and (45) |
| 45 | Brake cone, outer cone; inside |
| 46 | Mounting gap between (41) and (51) |
| 47 | Friction surface |
| 48 | Dead end bores for (71) |
| 49 | Bolts for brake cone (45) |
| 51 | Housing cover |
| 52 | Stepped bore, through bore |
| 53 | Cover bolts |

Listing of Reference Numerals -continued

| | |
|---|---|
| 54 | Thread |
| 55 | Cylindrical pin |
| 58 | Bolt (securing against rotation) |
| 59 | Pneumatic connection |
| 60 | Control member, cylinder-piston unit |
| 61 | Piston, annular piston |
| 62 | Dead end bores for springs |
| 63 | Seal ring, large |
| 64 | Seal ring, small |
| 65 | Brake cone, inner cone; outside |
| 66 | Bolts |
| 69 | Friction surface |
| 71 | Compression coil springs, spring element |
| 80 | Shaft |
| 81 | Shaft hub |
| 82 | Shaft shoulder for brake flange |
| 83 | Shaft shoulder for antifriction bearing |
| 84 | Antifriction bearing |
| 90 | Apparatus housing |
| 91 | Stepped bore |
| 92 | Housing shoulder |
| 93 | Safety ring |
| 94 | Flange surface |
| 95 | Mounting bolts |
| 96 | Shaft seal |
| 100 | Clamping ring |
| 111 | Flange connecting area |
| 115 | Mounting bores |
| 117 | Topside of (100) |
| 118 | Bottom side of (100) |
| 121 | Intermediate area |
| 122 | Spokes, segments in the intermediate area |
| 123 | slots |
| 131 | Clamping area |
| 132 | Clamping area, outside, truncated cone shaped |
| 133 | Clamping area, inside, truncated cone shaped |
| 137 | Segments in the clamping area |
| 138 | Slots |

What is claimed is:

1. In a brake and clamping arrangement for a shaft (80) supported in a device housing (40), comprising
a brake disc (10) supported rigidly on the shaft (80) for rotation therewith, the brake disc (10) having at least one friction area (31) with a truncated cone-shaped friction surface (32),
and at least one brake cone (65, 45), which is arranged in the device housing (40) adjacent the friction surface (32, 47) and, during braking or clamping in engagement the friction surface (32, 47), wherein
for a braking or clamping loading and for a vent unloading of the brake disc (10) said at least one brake cone (65, 45) is movable by either one of two actuating members one for movement in a loading and one for movement in an unloading direction or by a control member (60) for movement in one actuating direction and a spring system with at least one spring element (71) for movement in the other actuating direction, the improvement wherein
in the device housing (40) a clamping ring (100) is non-rotatably arranged,
the clamping ring (100) comprises a flange connecting area (111), an intermediate area (121) and a clamping area (131),
the clamping area (131) is movable in axial direction (8) with respect to the flange connecting area (111) over the intermediate range (121) which is disposed next to the clamping area (131) and which is elastic,
the clamping area (131) has an inner and an outer truncated cone shaped clamping surface (132, 133), and the inner clamping surface (132) is arranged opposite the friction surface (32) of the brake disc (10), whereas the outer clamping surface (133) is disposed in front of the friction surface (69) of the brake cone (65).

2. An arrangement according to claim 1, wherein the intermediate area (121) of the clamping ring (100) comprises elastic spokes (122).

3. An arrangement according to claim 2, wherein the clamping area (131) of the clamping ring (100) consists of individual segments (137) with slots (138) disposed between the segments, the same pitch as slots (123) between the spokes (122).

4. An arrangement according to claim 1, wherein the two clamping surfaces (132, 133) of the clamping ring (100) have the same cone angle (34, 35).

5. An arrangement according to claim 4, wherein the cone angle (34, 35) is between 10 and 30 angular degrees.

6. An arrangement according to claim 1, wherein the device housing (40) has a housing cover (51) and a mounting jointure arranged between the device housing (40) and the housing cover (51) is oriented normal to the center line (9) of the shaft (80).

7. An arrangement according to claim 6, wherein the flange connecting area (111) is clamped at least partly in the mounting jointure between the device housing (40) and the housing cover (51).

\* \* \* \* \*